US00RE40335E

(19) United States
(12) Reissued Patent
Gonzaga

(10) Patent Number: US RE40,335 E
(45) Date of Reissued Patent: May 27, 2008

(54) METHOD AND APPARATUS FOR ASSEMBLING/DISASSEMBLING A FLEXIBLE RING TO IN OR FROM A TIRED WHEEL

(75) Inventor: Tullio Gonzaga, Correggio (IT)

(73) Assignee: Butler Engineering & Marketing SRL, Rio Saliceto (IT)

(21) Appl. No.: 11/654,687

(22) Filed: Jan. 18, 2007

Related U.S. Patent Documents

Reissue of:
(64) Patent No.: 6,842,958
Issued: Jan. 18, 2005
Appl. No.: 10/410,168
Filed: Apr. 10, 2003

(51) Int. Cl.
*B23P 11/02* (2006.01)

(52) U.S. Cl. ..... 29/446; 29/426.5; 29/451; 29/894.37; 152/520

(58) Field of Classification Search ..... 29/522.1, 29/523, 894.37, 235, 802, 240, 446, 451; 152/203, 205, 207, 516, 518, 520; 254/50.1–50.4, 254/DIG. 10
See application file for complete search history.

(56) References Cited

U.S. PATENT DOCUMENTS

| | | | |
|---|---|---|---|
| 3,837,064 | A | 9/1974 | Membre et al. |
| 4,050,144 | A | 9/1977 | de Massacre |
| 4,251,906 | A | 2/1981 | Jacquemin |
| 4,270,592 | A | 6/1981 | Patecell |
| 4,516,617 | A | 5/1985 | Seitz et al. |
| 5,000,241 | A | 3/1991 | Patecell |
| 5,836,366 | A | 11/1998 | Muhlhoff |
| 6,039,825 | A | 3/2000 | Siegenthaler |
| 6,609,293 | B2 | 8/2003 | Corghi |

FOREIGN PATENT DOCUMENTS

| | | | |
|---|---|---|---|
| DE | 3411635 | * | 10/1985 |
| FR | 2 509 231 A | * | 1/1983 |
| JP | 02-141311 | * | 7/1989 |

* cited by examiner

*Primary Examiner*—David P. Bryant
*Assistant Examiner*—Christopher M Koehler
(74) *Attorney, Agent, or Firm*—Nixon & Vanderhye, PC

(57) ABSTRACT

Method of, and apparatus for, fitting a resilient ring substantially circular in shape into a tire, and removing it therefrom, the method comprising the following steps in sequence:

initial deforming of the resilient ring by slightly stretching it along one diameter thereof so as to cause it to change from a circular to an elliptical shape;

fitting of the thus deformed ring lengthwise into the light of a tire in which the ring is to be assembled;

first releasing of the ring whereby it tends to regain its initial circular shape while remaining engaged in the tire light;

final deforming of the resilient ring by stretching it in a radial direction within the tire, and final releasing of the deformable ring whereby it regains its initial circular shape within the tire.

8 Claims, 3 Drawing Sheets

90°
90°

METHOD AND APPARATUS FOR ASSEMBLING/DISASSEMBLING A FLEXIBLE RING TO IN OR FROM A TIRED WHEEL

Matter enclosed in heavy brackets [ ] appears in the original patent but forms no part of this reissue specification; matter printed in italics indicates the additions made by reissue.

BACKGROUND OF THE INVENTION

The present invention relates to a method of, and apparatus for, assembling and disassembling a resilient ring to and from a tire.

As known, wheels for motor vehicles suitable for allowing the motor vehicle to be driven even when a tire is flat have been available on the market for a number of years. This was made possible by providing a support ring made of relatively hard rubber material arranged on the wheel-rim within the tire of tired-wheels, and suitable for bearing the weight of the vehicle even when the tire has zero inner pressure. Such a system is commercially referred to as "PAX System".

The resilient ring is to be fitted into the tire before the latter is fitted into a wheel-rim. However, since a resilient ring is designed to have a longer outer diameter than the tire keying diameter, the fitting and removal of the resilient ring are very laborious operations that involve remarkable deftness and efforts by the operator.

SUMMARY OF THE INVENTION

The main object of the present invention is to provide a new method or process for fitting and removing a resilient ring into and from a tire with no difficulty and in a very expeditious way.

Another object of the present invention is to provide an apparatus for carrying out such a method that is suitable for eliminating the shortcomings and difficulties hitherto faced when assembling/disassembling resilient rings.

A not last object of the present invention is to provide an apparatus for assembling/disassembling resilient rings having a very simple structure and suitable for being manufactured at low cost, whose use does not involve any specific training or deftness by the operator.

According to a first aspect of the present invention there is provided a method of fitting a resilient ring substantially circular in shape into a tire, and removing it therefrom, which comprises the following steps in sequence:

first deforming of the resilient ring by slightly extending or stretching it along one diameter thereof so as to cause it to change from a circular to an elliptical shape;

fitting the thus deformed resilient ring lengthwise into the light of a tire in which the ring is to be assembled;

first releasing of the resilient ring whereby it tends to resiliently regain its initial circular shape while remaining engaged in the tire light, second deforming of the resilient ring by stretching or extending it in a radial direction in the tire; and final releasing of the deformable ring whereby it regains its circular shape within the tire.

Advantageously, second deforming step is preceded by a relative angular displacement of approximately 90° of the tire with respect to the resilient ring in its circular in shape.

For disassembling the resilient ring, the above sequence is followed in reverse order.

According to another aspect of the present invention, there is provided a stretching apparatus for carrying out the assembling/disassembling method set forth above, which apparatus comprises a widening device and a driving means for the widening device.

Advantageously said driving means comprises a linear actuator, such as a fluid-operated cylinder and piston assembly which, according to a preferred embodiment, can also act as a widening device.

BRIEF DESCRIPTION OF THE DRAWINGS

The invention will be described in further detail below with reference to two currently preferred embodiments thereof, given by way of illustrative not limiting example with reference to the accompanying drawings, in which.

In the various Figures of the drawings the same or similar components are designated by the same reference numerals.

DESCRIPTION OF THE PREFERRED EMBODIMENTS

Figures 1, 2, 3, 4, 5, 6:
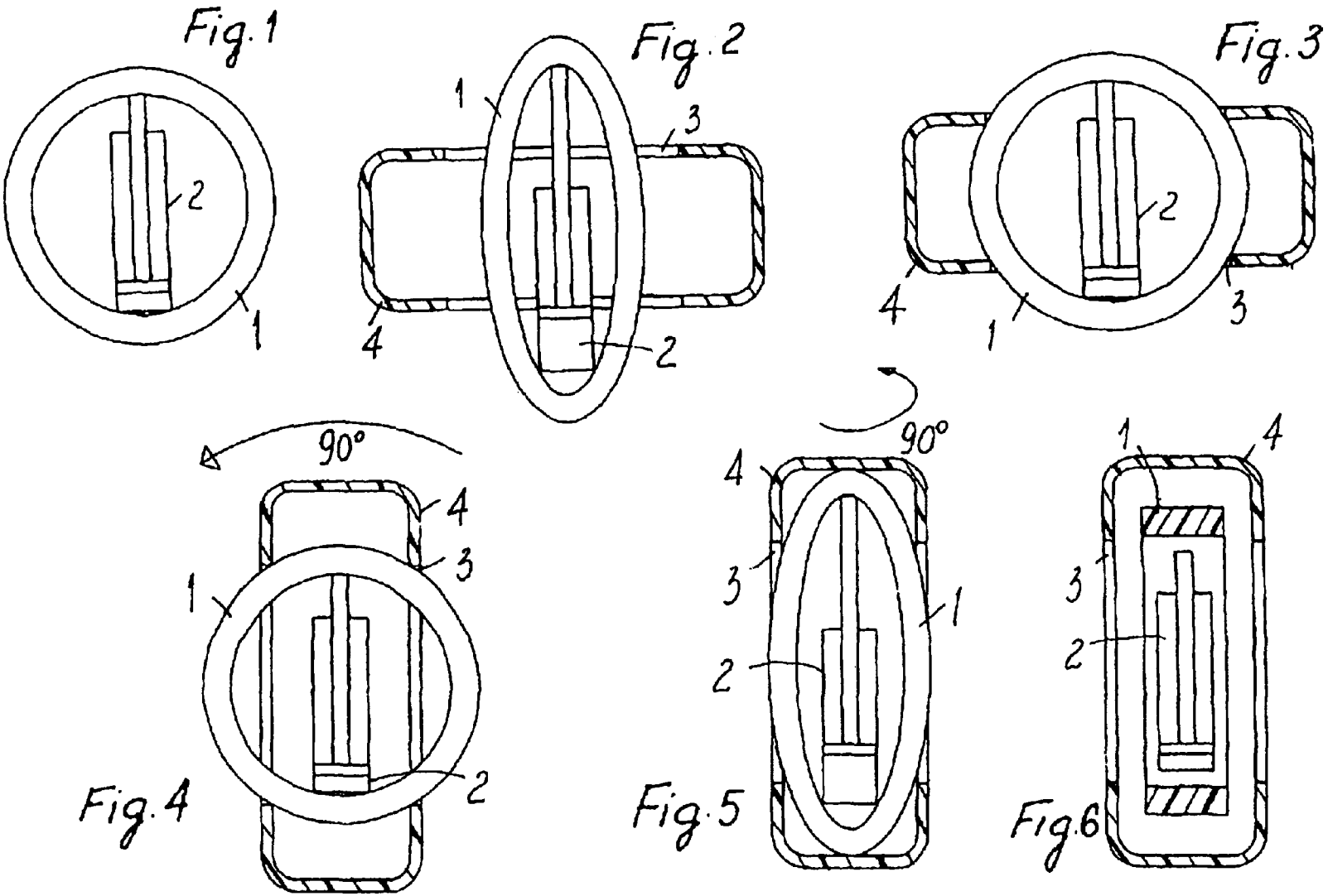
FIG. 1 is a diagrammatic view showing a resilient ring within which a linear stretching device is so positioned as to be oriented along one diameter of the ring.
FIG. 2 shows a diametral section of a tire in the centre light of which the resilient ring shown in FIG. 1 is fitted in a widened, i.e. ellipsoidal shape, so that it can be inserted through the tire central light.
FIG. 3 shows a view similar to that of FIG. 2, in which the resilient ring is in a released condition in the central light of the receiving tire.
FIG. 4 is a diagrammatic view similar to that shown in FIG. 3 in which the tire has been angularly displaced through about 90° with respect to the resilient ring positioned in it.
FIG. 5 shows the resilient ring shown in FIG. 1 stretched or widened in a radial direction with respect to and within the receiving tire and whilst being rotated through approximately 90° about its widening diameter with respect to the condition shown in FIG. 4.
FIG. 6 shows a cross-section view of the tire shown in FIG. 5 with the resilient ring mounted therein after the final contraction of the stretching device.

With reference first to the embodiment shown in FIGS. 1 to 6, it will be noted that a resilient ring made of a rubber material, normally circular in shape, is generally designated at 1. Within ring 1 a linear actuator 2 which is arranged along a diameter of ring 1 and acts as a stretching device. Linear actuator 2 can be of any suitable type, e.g. an air or oil operated piston and cylinder assembly, a motor-gear-rack assembly or any other equivalent or similar device.

Stretching device 1 is extended so as to deform ring 1, while widening it so that it takes a substantially elliptical, or "flattened" shape, and can be comfortably fitted (FIG. 2) into the centre light 3 of a tire 4 in which the resilient ring 1 is to be accommodated or received.

At this stage, stretching device 1 is caused to shrink, so that the resilient ring 1 is free to regain its standard circular shape in light 3 of the tire (FIG. 3) and remains resiliently engaged in it.

Tire 4 is then caused to rotate through approximately 90° with respect to about an axis normal to the lying plane of the resilient ring 1, or to resilient ring 1 within tire 4, about the same axis, so as to change from the arrangement shown in FIG. 3 to that shown in FIG. 4.

The operator then actuates the stretching device 2, which stretches the resilient ring 1 in a diametral direction with respect to and within tire 4. Resilient ring 1 takes the shape shown in FIG. 5, i.e. it is entirely transferred into the tire 4.

An approximately 90° rotation of the resilient ring 1 about its own stretching diameter is then effected within tire 4, whereby resilient ring 1 is brought to a substantially coaxial position with respect to tire 4 (FIG. 6), thus being perfectly, rapidly and easily accommodated inside the receiving tire.

In the embodiment shown in FIGS. 7 to 11, an articulated parallelogram shaped or pantograph-like stretching device 5 is located in resilient ring 1 and can be extended by a linear actuator 2 that can be located in two positions normal to each other, or by a pair of linear actuators arranged to act in directions perpendicular to each other.

Figure 9:
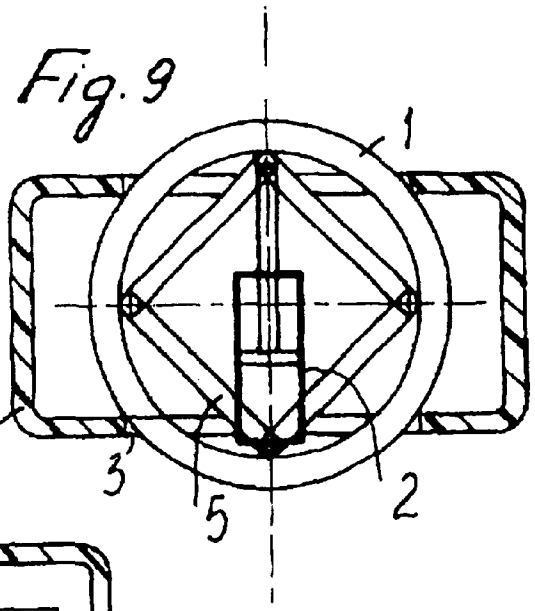
FIG. 9 shows a view similar to that of FIG. 8, in which the resilient ring is in a released condition in the central light of the receiving tire.
Figure 8:
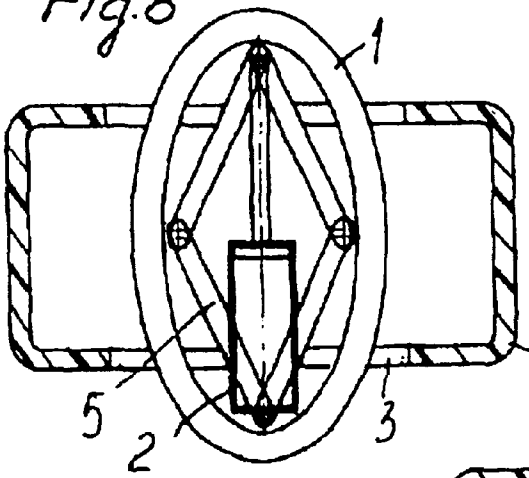
FIG. 8 shows a diametral cross-section of a tire into the centre light of which the resilient ring of FIG. 7 is fitted, the resilient ring being widened, thus ellipsoid in shape, so that it can be inserted into the central light of the tire.

One then proceeds with widening the resilient ring 1 in a diametral direction and the resilient ring 1 is fitted lengthwise into centre light 3 of the receiving tire 4 (FIG. 8). The stretching device is then released so that resilient ring 1 regains its standard circular shape and remains engaged in light 3 (FIG. 9).

The operator then causes pantograph 5 to be extended in a perpendicular direction to that in which the resilient ring had been previously stretched, i.e. in a diametral direction with respect to tire 4, whereby it is entirely fitted into tire 4 (FIG. 10), after which the operator manually causes the resilient ring 1 to be rotated through approximately 90° in the tire about the diametrical direction along which the resilient ring is extended. Finally, parallelogram or pantograph 5 is caused to collapse or shrink, thus obtaining the configuration shown in FIG. 11 whilst being entirely and correctly located within tire 4.

Figure 7:
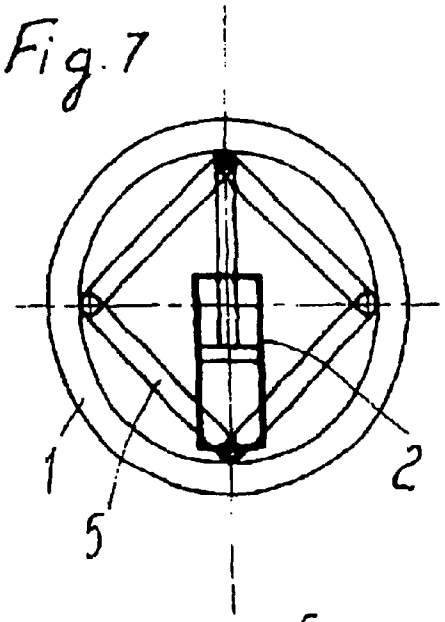
FIG. 7 shows a resilient ring in which a pantograph-like stretching device according to another embodiment of the invention is located.
Figure 11:
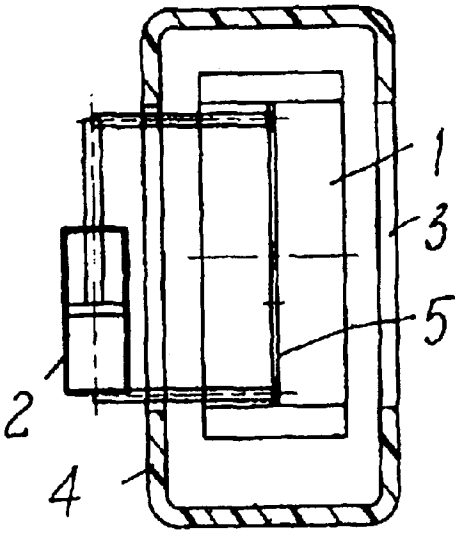
FIG. 11 shows a cross-section view of the tire of FIG. 10 and the resilient ring fitted into it after the pantograph-like stretching device has been shrunk.
Figure 10:
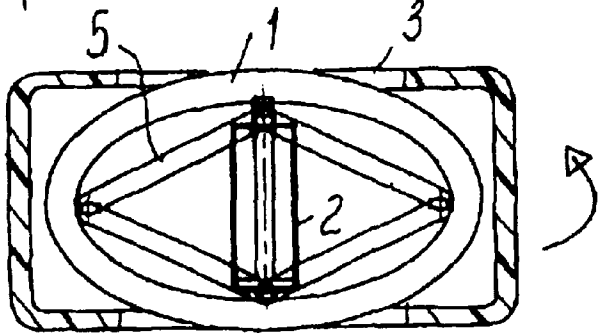
FIG. 10 shows the resilient ring of FIG. 9 stretched or widened in a radial direction with respect to and within the receiving tire, but about a second diameter approximately 90° with respect to that of FIG. 8 and whilst being rotated through approximately 90° about said second widening diameter so as to be correctly positioned within the tire.

To remove the resilient ring 1, one proceeds by following the same sequence in reverse order, i.e. from FIG. 11 to FIG. 7, or from FIG. 6 to FIG. 1.

Figure 12:
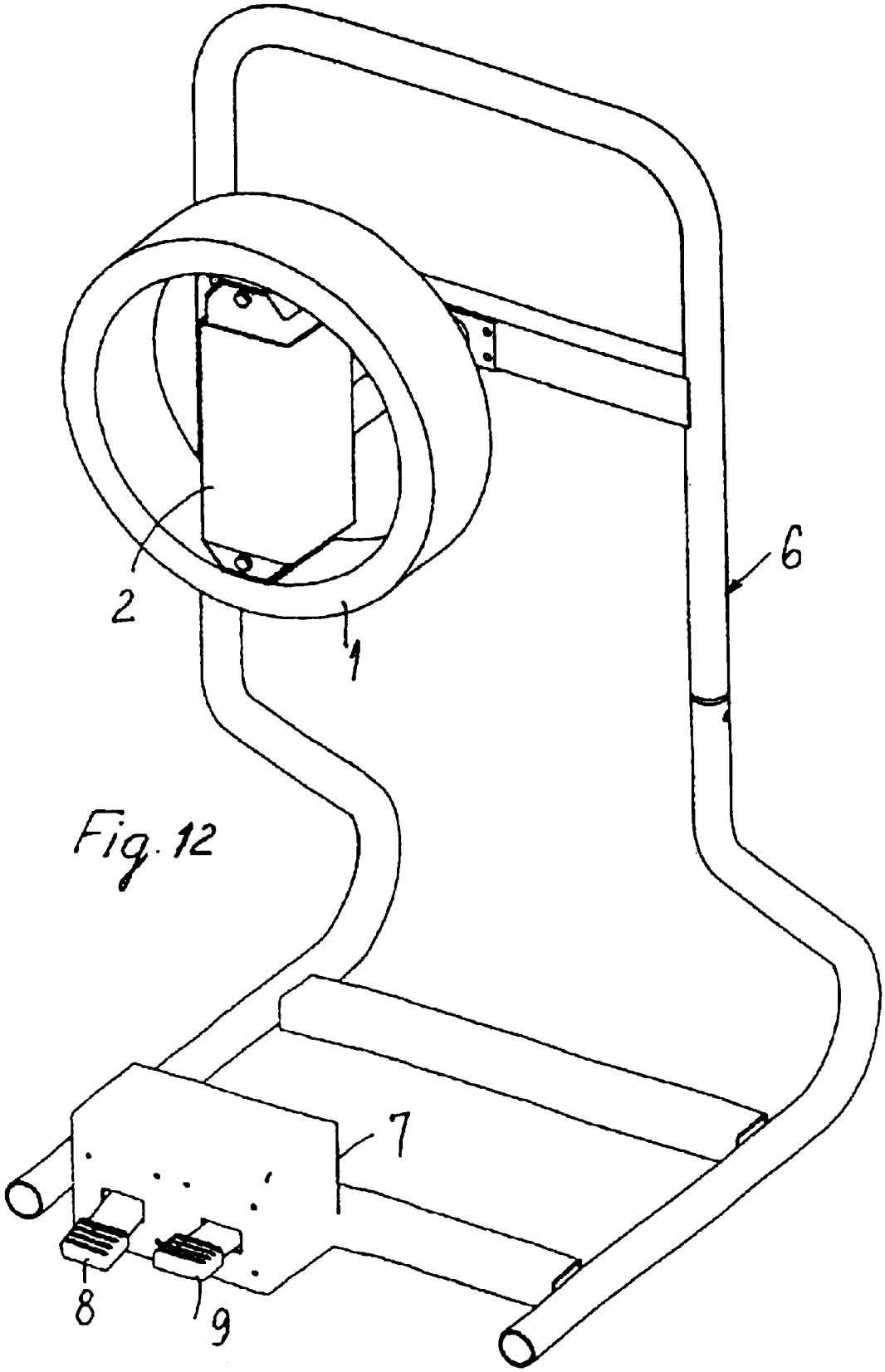
FIG. 12 shows a stretching apparatus according to the present invention mounted on a support frame and provided with control pedals.

As shown in FIG. 12, the stretching device 2 or 5 is advantageously overhangingly supported by a support frame generally designated at 6, which is provided with a control box 7, having control pedals 8 and 9 in the case of pantograph 5 designed to be extended in two perpendicular directions, or with one pedal in case of a linear stretching device 2.

The invention set forth above is susceptible to numerous modifications and variations within its scope as defined by the claims.

What is claimed is:

1. A method of fitting a resilient ring substantially circular in shape into a tire, and removing it therefrom which comprises the following steps in sequence:

first deforming of the resilient ring by slightly extending or stretching it along one diameter thereof so as to cause it to change from a circular to an elliptical shape;

fitting the thus deformed resilient ring lengthwise into the light of a tire in which the ring is to be assembled;

first releasing of the resilient ring whereby it tends to resiliently regain its initial circular shape while remaining engaged in the tire light;

rotating the [resilient ring] *tire relative to the resilient ring* through approximately 90 degrees about an axis [coinciding with said radial direction with respect to the tire] *normal to a plane containing the resilient ring*;

second deforming of the resilient ring by stretching or extending it in a radial direction in the tire-[wherein said second deforming Is preceded by a relative angular movement of about 90 degrees between tire and resilient ring in its circular configuration] *thereby establishing a stretching diameter*;

*rotating the resilient ring through 90 degrees about an axis coinciding with said stretching diameter*; and final releasing of the deformable ring whereby it regains its circular shape within the tire.

2. A method according to claim 1, wherein the steps are carried out using a stretching apparatus, comprising:

a widening device arranged to act substantially along a diameter within said resilient ring thereby deforming said resilient ring to take a substantially elliptical or flattened shape, and a drive for the widening device.

3. A method according to claim 2, wherein said widening device comprises a pantograph or an articulated parallelogram.

4. A method according to claim 2, wherein said widening device comprises the drive.

5. A method according to claim 2, wherein said drive comprises a linear actuator.

6. A method according to claim 2, wherein the apparatus further comprises:

a support frame for said widening device and said drive and a control unit for said drive.

*7. A method of fitting a resilient ring substantially circular in shape into a tire, and removing it therefrom, which comprises the following steps in sequence:*

*first deforming of the resilient ring by slightly extending or stretching it along one diameter thereof so as to cause it to change from a circular to an elliptical shape;*

*fitting the thus deformed resilient ring lengthwise into the light of a tire in which the ring is to be assembled;*

*first releasing of the resilient ring whereby it tends to resiliently regain its initial circular shape while remaining engaged in the tire light,*

*second deforming of the resilient ring by stretching or extending it in a radial direction in the tire;*

*angularly rotating the resilient ring in its deformed state about 90 degrees with respect to said tire; and*

*final releasing of the resilient ring whereby it regains its circular shape within the tire.*

*8. A method according to claim 7, wherein said second deforming is preceded by an angular rotation of about 90° of said resilient ring relative to said tire about an axis of rotation coinciding with a radial direction with respect to the tire.*

* * * * *